US012774972B2

(12) United States Patent
Landry

(10) Patent No.: US 12,774,972 B2
(45) Date of Patent: Oct. 27, 2026

(54) SYSTEMS AND METHODS FOR MEASURING THERMAL PROPERTIES OF SOLID MATERIALS

(71) Applicant: Thermtest Inc., Hanwell (CA)

(72) Inventor: David Landry, Cumberland Bay (CA)

(73) Assignee: Thermtest Inc., Hanwell (CA)

( * ) Notice: Subject to any disclaimer, the term of this patent is extended or adjusted under 35 U.S.C. 154(b) by 314 days.

(21) Appl. No.: 18/606,705

(22) Filed: Mar. 15, 2024

(65) Prior Publication Data

US 2024/0319124 A1 Sep. 26, 2024

Related U.S. Application Data

(60) Provisional application No. 63/453,231, filed on Mar. 20, 2023.

(51) Int. Cl.
*G01N 25/18* (2006.01)

(52) U.S. Cl.
CPC .................................... *G01N 25/18* (2013.01)

(58) Field of Classification Search
CPC ..... G01N 25/18; G01N 25/20; G01N 25/4866
See application file for complete search history.

(56) References Cited

U.S. PATENT DOCUMENTS 5,112,136 A * 5/1992 Sakuma ................. G01N 25/18 374/110
5,335,993 A * 8/1994 Marcus .................. G01N 25/18 374/33
5,711,604 A * 1/1998 Nakamura ............ G01N 25/18 374/10
2025/0244270 A1* 7/2025 Landry .................. G01N 25/20

FOREIGN PATENT DOCUMENTS

JP 2016024083 A * 2/2016
WO WO-2018100608 A1 * 6/2018 ............. G01N 25/18

OTHER PUBLICATIONS

Computer translation of JP_2016024083_A (Year: 2026).*
Computer translation of WO_2018100608_A1 (Year: 2026).*

* cited by examiner

*Primary Examiner* — Randy W Gibson
(74) *Attorney, Agent, or Firm* — Shumaker & Sieffert, P.A.

(57) ABSTRACT

Systems and methods are disclosed for determining a thermal property of a small and/or conductive sample material. Measurement data of the sample material is obtained using a transient plane source sensor placed in contact with at least one solid cylinder slab of the sample material, wherein each of the at least one solid cylinder slab of the sample material has a slab radius that is larger than a radius of the sensor and less than twice as large as the radius of the sensor. The power supplied to the transient plane source sensor over the measurement period is sufficient to provide a temperature response in at least a radial boundary of each of the at least one solid cylinder slab. A non-linear fitting technique is applied to determine a modeled thermal property of the sample material.

20 Claims, 9 Drawing Sheets

300

710

750

SYSTEMS AND METHODS FOR MEASURING THERMAL PROPERTIES OF SOLID MATERIALS

CROSS-REFERENCE TO RELATED APPLICATIONS

This application claims priority to U.S. Provisional Patent Application No. 63/453,231, filed on Mar. 20, 2023, the entire contents of which is incorporated herein by reference for all purposes.

TECHNICAL FIELD

The present disclosure relates to measuring thermal properties of solid materials, and in particular to measuring thermal properties of solid materials using a transient plane source sensor.

BACKGROUND

Transient plane source systems are used for transient measurements of thermal properties such as thermal conductivity and diffusivity. A sensor is placed within a sample of material and electricity is passed through the sensor to heat up the surrounding sample of material. The sensor acts as both a heating and a heat-sensing item. The electricity heats up the sensor and the surrounding sample material, and the resistance of the sensor is related to the temperature of the surrounding sample material. Accordingly, a time-dependent temperature increase of the sample material can be recorded, and thermophysical properties of the sample can be determined from the temperature data using thermal equations, which are a function of time, thermal conductivity, and thermal diffusivity.

Existing transient plane source systems and corresponding data analysis are designed for large, non-conductive, and isotropic samples of material, where heat does not hit the boundaries of the sample quickly. However, it will be appreciated that certain sample materials are small and conductive, and may also have anisotropic thermal properties. In attempt to handle small samples, current measurement techniques require volumetric heat capacity to be input and the data is truncated so that thermal effects at the boundaries of the sample material (or at least the radial boundary) are omitted. However, the results of these existing methods are often inaccurate, and it would be desirable to avoid input of volumetric heat capacity and/or truncating data.

Accordingly, systems and methods for measuring thermal properties of solid materials remain highly desirable.

SUMMARY

In accordance with one aspect of the present disclosure, a thermal property measurement method is disclosed, comprising: receiving measurement data of a sample material over a measurement period obtained using a transient plane source sensor placed in contact with at least one solid cylinder slab of the sample material, wherein each of the at least one solid cylinder slab of the sample material has a slab radius that is larger than a radius of the sensor and less than twice as large as the radius of the sensor, and the measurement data includes time data within the measurement period, measured temperature data of the sample material, and a power supplied to the transient plane source sensor over the measurement period, wherein the power supplied to the transient plane source sensor over the measurement period is sufficient to provide a temperature response in a radial boundary of each of the at least one solid cylinder slab; determining an initial guess of a thermal transport property of the sample material; and applying a non-linear fitting technique to determine a modeled thermal property of the sample material using the initial guess of the thermal transport property and a temperature equation that is a function of the thermal transport property, time, and the power supplied to the transient plane source sensor, wherein the thermal transport property of the sample material is a fit parameter in the non-linear fitting technique.

In some aspects, the modeled thermal property of the sample material comprises a modeled thermal transport property determined from the non-linear fitting algorithm.

In some aspects, the method further comprises determining a modeled volumetric heat capacity from the modeled thermal transport property.

In some aspects, the fit parameters of the non-linear fitting technique further include volumetric heat capacity, the method further comprising determining an initial guess of the volumetric heat capacity, and wherein a modeled volumetric heat capacity is determined from the non-linear fitting algorithm.

In some aspects, the fit parameters of the non-linear fitting technique further include a temperature offset, and the method further comprises determining an initial guess of the temperature offset.

In some aspects, the fit parameters of the non-linear fitting technique further include a time offset, and the method further comprises determining an initial guess of the time offset.

In some aspects, the sample material is anisotropic, and the thermal transport property comprises directional thermal properties including at least one axial directional thermal property and at least one radial directional thermal property.

In some aspects, the at least one axial directional thermal property comprise one or more of: axial thermal diffusivity, axial thermal conductivity, and axial thermal effusivity, and wherein the at least one radial directional thermal property comprise one or more of: radial thermal diffusivity, radial thermal conductivity, and radial thermal effusivity.

In some aspects, the sample material is isotropic, and the thermal transport property comprises at least one of thermal diffusivity, thermal conductivity, and thermal effusivity.

In some aspects, the sensor is placed between and is in contact with two solid cylinder slabs of the sample material.

In some aspects, the sensor is placed in contact with one solid cylinder slab of the sample material, and wherein an opposing surface of the sensor is in contact with insulation.

In some aspects, each of the at least one solid cylinder slab of the sample material is in contact with the sensor at a first surface and is in contact with insulation at a second surface opposite the first surface, the insulation having known thermal properties, and wherein the temperature equation accounts for the insulation.

In some aspects, the non-linear fitting technique is applied to a time window of the time data that is a subset of the measurement period, and the method further comprises calculating modeled temperatures outside the time window using the modeled thermal property.

In some aspects, the power supplied to the transient plane source sensor over the measurement period is also sufficient to provide a temperature response in an axial boundary of each of the at least one solid cylinder slab.

In some aspects, the power supplied to the transient plane source sensor over the measurement period does not provide a temperature response in an axial boundary of each of the at least one solid cylinder slab.

In accordance with another aspect of the present disclosure, a thermal property measurement system is disclosed, comprising: a processor; and a non-transitory computer-readable memory storing computer-executable instructions which, when executed by the processor, configure the system to perform the method of any one of the above aspects In some aspects, the computer-executable instructions, when executed by the processor, further configure the system to control the power supplied to the transient plane source sensor.

In some aspects, the system further comprises the power source and the transient plane source sensor.

In accordance with another aspect of the present disclosure, a non-transitory computer-readable memory storing computer-executable instructions which, when executed by a processor, configure the processor to perform the method of any one of the above aspects.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

In accordance with the present disclosure, systems and methods are disclosed for determining a thermal property of a small and/or conductive sample material. Measurement data of the sample material is obtained using a transient plane source sensor placed in contact with at least one solid cylinder slab of the sample material, wherein each of the at least one solid cylinder slab of the sample material has a slab radius that is larger than a radius of the sensor and less than twice as large as the radius of the sensor. The power supplied to the transient plane source sensor over the measurement period is sufficient to provide a temperature response in at least a radial boundary of each of the at least one solid cylinder slab. A non-linear fitting technique is applied to determine a modeled thermal property of the sample material using an initial guess of a thermal transport property of the sample material and a temperature equation that is a function of the thermal transport property among other parameters.

Advantageously, in accordance with the systems and methods described in the present disclosure, accurate measurements of thermal properties can be obtained for small and/or conductive sample materials where heat from the transient plane source sensor hits the radial boundaries of the slabs. Other thermal properties such as volumetric heat capacity are not a required input, and indeed volumetric heat capacity can also be determined from the systems and methods disclosed herein. Further, the systems and methods described herein can be applied for both isotropic and anisotropic sample materials. In some embodiments, the sensor is placed between and is in contact with two solid cylinder slabs of the sample material. In other embodiments, the sensor is placed in contact with one solid cylinder slab of the sample material, and an opposing surface of the sensor is in contact with insulation. Each of the at least one solid cylinder slab of the sample material may be in contact with the sensor at a first surface and in contact with insulation at a second surface opposite the first surface, and the temperature equation may be used that accounts for known thermal properties of the insulation Embodiments are described below, by way of example only, with reference to FIGS. 1-7C.

Figure 1:
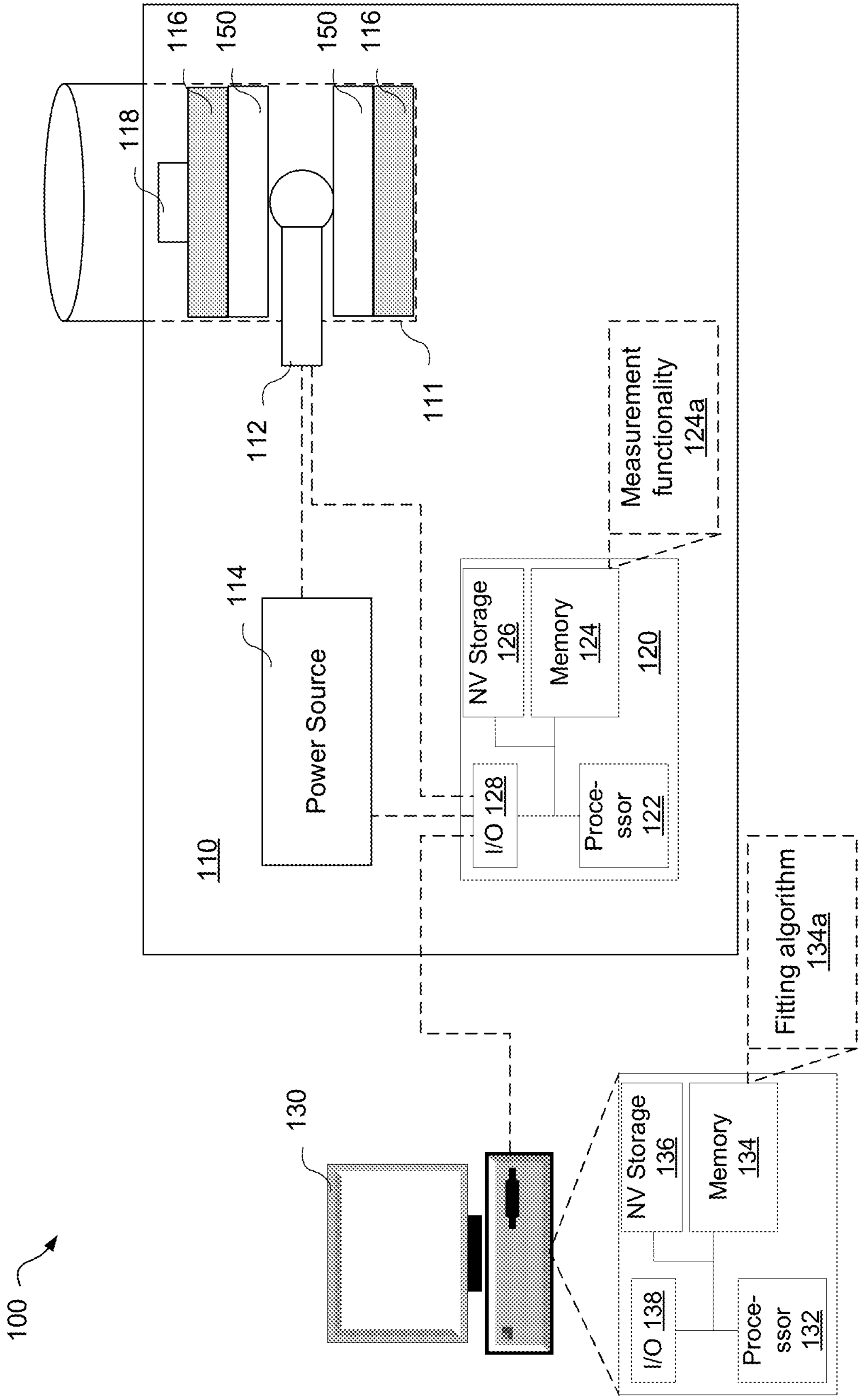
FIG. 1 shows a system for measuring a thermal property of a solid sample material.

FIG. 1 shows a system 100 for measuring a thermal property of a solid sample material. The system 100 comprises a measurement device 110 comprising a sensor 112 that is configured to perform thermal measurements of a sample material 150. The sample material 150 is a solid material, and may either be a bulk solid or comprise at least one solid slab, which are placed in a measurement chamber 111. The measurement device 110 comprises a sensor 112 that is configured to be placed within the bulk solid, or in contact with at least one slab, such as interposed between two slabs. In accordance with the thermal property measurement methods and systems of the present disclosure, the sample material may be either an isotropic or anisotropic sample material and comprises at least one solid cylinder slab of the sample material, wherein each slab of the sample material has a slab radius that is larger than a radius of the sensor and less than twice as large as the radius of the sensor 112. In accordance with some embodiments of the disclosure, each slab should also preferably have a height/thickness smaller than twice a radius of the sensor 112, preferably smaller than the radius of the sensor. If there are two slabs of sample material (i.e. one in contact with respective surfaces of the sensor), the slabs should be identical. The limitations on sample size relative to the sensor can be violated but doing so leads to lower repeatability and less confidence in the measurement results. In alternative embodiments, the thickness of the slabs may be significantly larger than a radius of the sensor (e.g. more than twice as large), and a different equation used for determining a thermal property of the sample. The cylindrical slab(s) are placed in the measurement chamber such that a radial direction of the cylinder is parallel to the sensor interface and an axial direction of the cylinder perpendicular to the sensor interface.

The sensor 112 is configured to receive electrical power from a power source 114, which in turn causes the sample material 150 to heat up. The sensor 112 acts as both a heating and a heat-sensing item. The electricity heats up the sensor 112 and the surrounding sample material 150, and the sensor 112 is configured to measure a temperature of the sample material. In particular, the resistance of the sensor 112 is related to the temperature of the surrounding sample material 150, and a time-dependent temperature increase of the sample material 150 can thus be recorded. Insulation 116 with known thermal properties may be placed around the sample material (i.e. above and below the slabs of sample material 150) to prevent axial heat leakage. That is, each slab of the sample material may be in contact with the sensor at a first surface and in contact with insulation at a second surface opposite the first surface. Additionally or alternatively, where the sensor 112 is in contact with only one slab of sample material (i.e. at a first surface of the sensor 112), an opposing surface of the sensor 112 may be directly in contact with insulation 116. A pressure source may be used to ensure sufficient contact between the sensor 112 and the sample material 150. As one example, a weight 118 (e.g. 10 lbs) may be placed on the top layer of insulation 116.

A controller 120 is configured to control the power source 114 to supply the electric power to the sensor 112, and is also configured to receive sensor data comprising temperature measurements from the sensor 112. The controller shown in FIG. 1 is shown as comprising a processing unit 122, which may for example be a central processing unit (CPU), a microprocessor, field programmable gate array (FPGA), or an application specific integrated circuit (ASIC). The controller 120 also comprises a non-transitory computer-readable memory 124, a non-volatile storage 126, and an input/output interface 128. The controller 120 is coupled to the power source 114 and the sensor 112 via I/O interface 118, and is configured to receive measurement data from the sensor 112 and to send commands to the power source 114. The controller 120 may also be coupled to one or more external processing devices and/or displays, such as external processing device 130, which may for example be a lab computer configured to send measurement commands to the controller 120 (e.g. what parameters to use for the thermal measurements), and the controller 120 is configured to send measurement data to the lab computer. The memory 124 of controller 120 stores non-transitory computer-readable instructions that are executable by the processing unit 122 to configure the controller 120 to execute certain methods and to provide certain functionality as described herein. In particular aspects, the system 100 is configured to measure thermal properties of sample materials that have isotropic or anisotropic thermal properties, and the memory 124 has computer-executable instructions stored thereon for implementing measurement functionality 124*a*, which when executed configure the controller 120 to perform certain functionality including control of the power source 114 and receiving the sensor measurements from sensor 112. It some implementations, the memory 124 may also have computer-executable instructions stored thereon for implementing a fitting algorithm (described below) to analyze the measurement data and determine one or more thermal properties of the sample material. The results of the data analysis at the controller 120 may be output to the external processing device 130 or a display on the measurement device 110, for example. However, in the example of FIG. 1 the data analysis is performed by the external processing device 130 that is communicatively coupled to the controller 120.

For measuring a thermal property of small and/or conductive cylindrical sample materials, the controller 120 is configured to control the power source 114 to supply the electric power at a pre-determined power and for a pre-determined time, the pre-determined power and the pre-determined time being sufficient for the sensor 112 to measure a temperature change on a radial boundary of the slab(s) of sample material 150. As described above, the slab(s) of the sample material should have a slab radius that is larger than a radius of the sensor but less than twice as large as the radius of the sensor 112. The cylindrical slab(s) and the sensor should be lined up such that they have a common axial center. As described above, in some embodiments the power may be supplied for a pre-determined power and pre-determined time to also provide a temperature response in an axial boundary of the sample, in which case each slab of the sample material should preferably have a thickness less than twice a radius of the sensor, preferably less than a radius of the sensor. It will also be appreciated that the slab(s) of sample material may exceed this limitation, but the electric power may be supplied for a pre-determined power and pre-determined time to still produce a temperature response on the axial boundary. In alternative embodiments, the slab(s) may have a height/thickness that is much larger than the radius of the sensor such that the electric power does not produce a temperature response in the axial boundary. Such samples may be treated as infinitely tall cylinders and different equations can be employed for determining thermal properties of the sample material.

As an example, the sample material may comprise isotropic cylindrical slabs of copper of thickness 3 mm and 10 mm in radius (20 mm diameter). The height and diameter are verified with a micrometer and a 6.4 mm radius sensor is selected for the testing. The samples are placed in a sensor stand (with the sensor in between them) and polystyrene insulation is used to prevent axial heat leakage. A 10 lbs weight is put on top to ensure good contact between the sensor and samples. 2000 mW are applied over 2 s; the response of the sensor over those 2 s is recorded and passed to the fitting algorithm for determining a thermal property of the sample.

As another example, the sample material may comprise anisotropic cylindrical slabs of polymer of thickness 3 mm and 10 mm in radius (20 mm diameter) and the manufacturing method is such that anisotropy is unavoidable. The height and diameter are verified with a micrometer and a 6.4 mm radius sensor is selected for the testing. The samples are placed in a sensor stand (with the sensor in between them) and polystyrene insulation is used to prevent axial heat leakage. A 10 lbs weight is put on top to ensure good contact between the sensor and samples. 2000 mW are applied over 20 s; the response of the sensor over those 20 s is recorded and passed to the fitting algorithm for determining a thermal property of the sample.

The power supplied to the sensor should be selected such that the temperature rise over the expected fit range is greater than some value that depends on the sensitivity of the system. As one example, it may be beneficial to control the power and operation time such that the increase in temperature is greater than 0.5° C. The selection of operation time should be in a way such that there is enough data points within the transient phase to ensure that all fit parameters or values required for curve fitting are clear and distinct from one another. In most embodiments, a general criterion exists for the measurements of thermal properties using the transient plane source methods where typically, the operation parameters are selected such that $$\frac{\kappa t_{max}}{a^2}$$

is a value between 0.3 and 1 where $\kappa$ is the thermal diffusivity and $t_{max}$ is the maximum time. For measurements of an anisotropic slab in accordance with the present disclosure, replacing $\kappa$ in $$\frac{\kappa t_{max}}{a^2}$$

with radial diffusivity, $\kappa_r$, and axial diffusivity, $\kappa_z$, then ensuring that the resulting value is between 0.3 and 1, generally provides a satisfactory criterion for most embodiments, however it will be appreciated that the disclosure is not limited to such.

In accordance with fitting processing disclosed herein, the heating should reach the radial boundary and optionally (depending on the sample being tested) the axial boundary of the cylindrical slabs of sample material. A user may use estimated properties to get a sense of how long the test should be and an amount of power that should be supplied.

Measurement data comprising temperature measurements with respect to time are received from the sensor 112, and may be analyzed by the controller 120 or be output for analysis, for example to the processing device 130. Note that in some embodiments, the processing device 130 may be part of the system 100 and sold with the measurement device 110, while in other embodiments the processing device 130 may be external to the measurement device 110, and may even be remote from the measurement device 110.

The processing device 130 comprises a processing unit 132, which may for example be a central processing unit (CPU), a microprocessor, field programmable gate array (FPGA), or an application specific integrated circuit (ASIC). The processing device 130 also comprises a non-transitory computer-readable memory 134, a non-volatile storage 136, and an input/output interface 138. The processing device 130 is coupled to the measurement device 110 via I/O interface 138, and is configured to receive measurement data including the temperature and time data from the sensor 112 as well as the power data. The measurement data may be received from controller 120, or a combination of components of the measurement device 110. For example, the processing device 130 may receive the sensor data directly from the sensor 112. The memory 134 stores non-transitory computer-readable instructions that are executable by the processing unit 132 to configure the processing device 130 to execute certain methods and to provide certain functionality as described herein. In particular aspects, the processing device 130 is configured to execute a fitting algorithm **134*a* that configures the processing device 130 to determine one or more modeled thermal properties of the sample material 150 based on the measurement data. More specifically, the processing device 130 is configured to apply a non-linear fitting technique to the measurement data to determine one or more modeled thermal properties of the sample material 150. Among other inputs, a height of the sample material may be used in the equation in the non-linear fitting technique, which may be determined using a micrometer that may be part of the measurement device 110. Methods for determining modeled thermal properties of the sample material from the measurement data are described in more detail with reference to FIGS. 3 through 5**.

Figure 2:
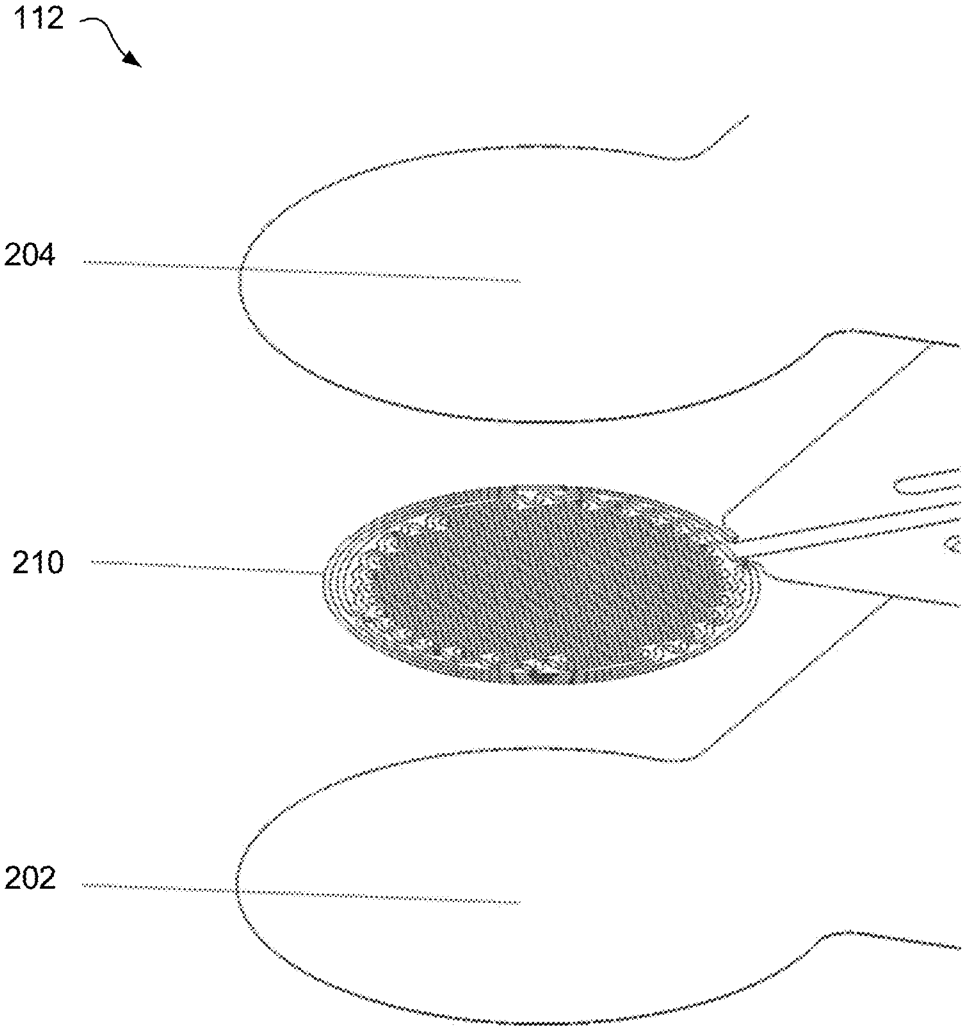
FIG. 2 shows an exploded representation of an example of a sensor used in the system of FIG. 1.

FIG. 2 shows an exploded representation of an example of sensor 112 used in the system of FIG. 1. The sensor 112 comprises a base 202, a cover 204, and an electrically conductive heating element 210. FIG. 2 shows an exploded view of the sensor 112; when assembled, the electrically conductive heating element 210 is provided on the base (e.g. etched onto the base or otherwise placed onto the base), and the cover 204 is bonded to the base 202 to secure the electrically conductive heating element 210 in place. Bonding between the base 202 and cover 204 should be strong enough for them to be considered one element.

In use, and as described with reference to FIG. 1, the sensor 112 is in contact with a sample material for measuring thermophysical properties of the sample material. The sensor 112 acts as both a heating and a heat-sensing item. The electrically conductive heating element 210 is configured to conduct electricity, which heats up the sensor and the surrounding sample material. The resistance of the electrically conductive heating element 210 is related to the temperature of the surrounding sample material. The electrically conductive heating element 210 may be made of an electrically conductive metal, such as nickel or platinum. The base 202 and the cover 204 may be made of an electrical insulating material such as Kapton®, mica, or polyetheretherketone (PEEK). The base 202 and the cover 204 allow for the sample material to be heated by the electrically conductive heating element, while still providing a desired structural support for the electrically conductive heating element 210. Resistance recordings are taken during a measurement period for recording the time dependent temperature increase of the sample material. Electricity through the electrically conductive heating element 210 is provided via electrical leads coupled to the power source and is controlled by a controller as described with reference to FIG. 1.

Figure 3:
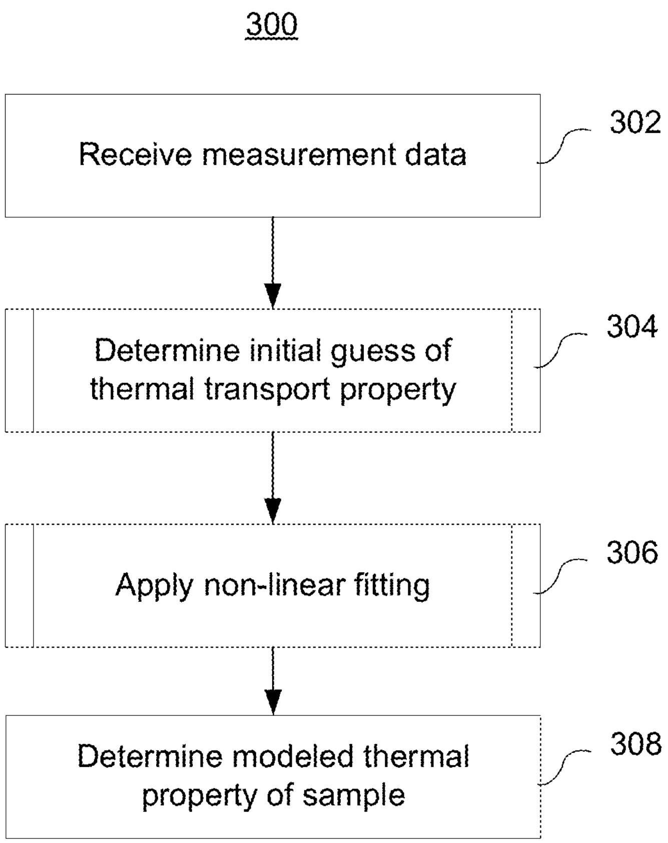
FIG. 3 shows a method of determining a thermal property of a sample material.

FIG. 3 shows a method 300 of determining a thermal property of a sample material that is small and/or conductive relative to the sensor. It will be appreciated that the sample material can be isotropic or anisotropic and the method can be adapted accordingly by updating the equations used in the fitting technique as described below. The method 300 may for example be performed by the controller 120 of the measurement device 110 or by an external processing device 130, as shown in FIG. 1. The method 300 may be performed by a processor when executing computer-executable instructions stored in a non-transitory computer-readable memory.

The method 300 comprises receiving measurement data (302). The measurement data is taken of the sample material over a measurement period using a transient plane source sensor placed in contact with at least one solid cylinder slab of the sample material, wherein each of the at least one solid cylinder slab of the sample material has a slab radius that is larger than a radius of the sensor and less than twice as large as the radius of the sensor. The measurement data may be taken for different testing configurations. For example, In some embodiments, the sensor is placed between and is in contact with two solid cylinder slabs of the sample material. In other embodiments, the sensor is placed with one surface in contact with a solid cylinder slab of the sample material, and an opposing surface of the sensor is in contact with insulation. Each of the at least one solid cylinder slab of the sample material may be in contact with the sensor at a first surface and in contact with insulation at a second surface opposite the first surface, as is shown in the configuration of FIG. 1.

Figure 6:
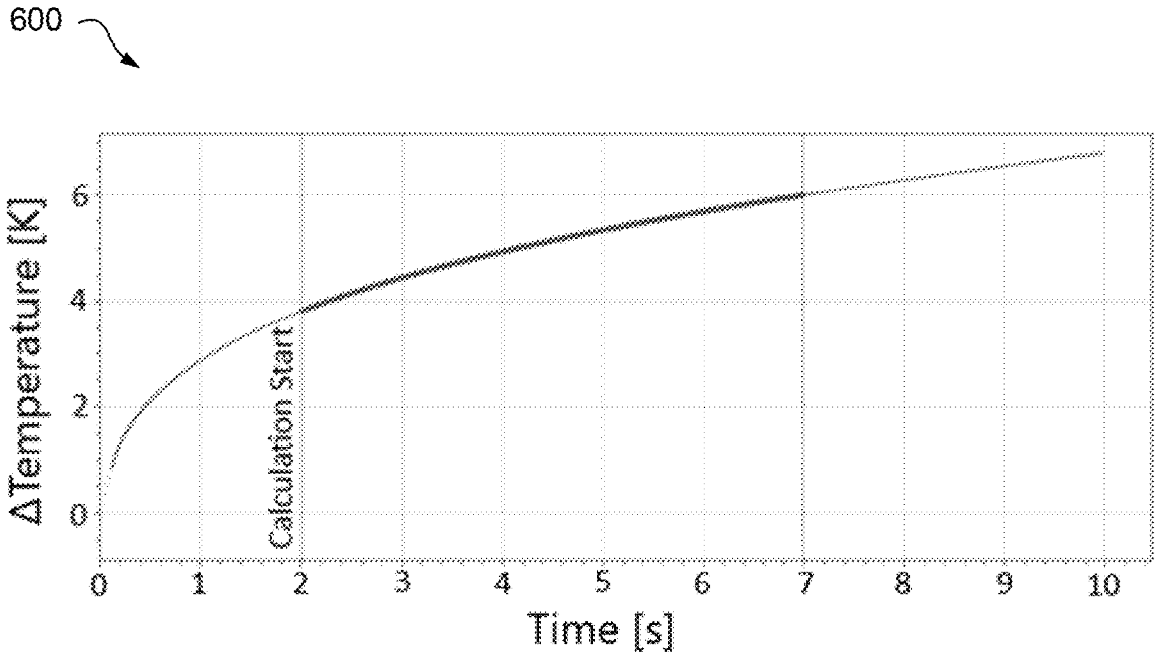
FIG. 6 shows a graph of an example temperature transient obtained from measurement.

The measurement data includes time data within the measurement period, measured temperature data of the anisotropic sample material, and a power supplied to the transient plane source sensor over the measurement period. That is, the measurement data comprises a set of data obtained comprising: the set of measured times t; the set of measured temperatures T, each corresponding to a specific measured time $t_i$; and the power supplied to the transient plane source sensor. FIG. 6 shows a graph 600 of an example temperature transient obtained from measurement, which is over a measurement period of 10 s performed on an anisotropic polymer and at a power of 500 mW.

The power supplied to the transient plane source sensor over the measurement period is sufficient to provide a temperature response in a radial boundary of each of the at least one solid cylinder slab. In some embodiments, the power supplied to the transient plane source sensor over the measurement period may also provide a temperature response in an axial boundary of each of the at least one slab. In this case, a thickness of each of the at least one slab may be less than twice a radius of the sensor. In other embodiments, the power supplied to the transient plane source sensor over the measurement period may not provide a temperature response in the axial boundary of each of the at least one slab. In this case, a thickness of each of the at least one slab may for example be greater than twice a radius of the sensor. Depending on whether a temperature response is being produced in the axial boundary of the slabs, different equations may be used in the fitting algorithm as described below.

An initial guess of a thermal transport property, such as thermal diffusivity, thermal conductivity, or thermal effusivity, of the sample material is determined (304). For an anisotropic sample material, the thermal transport property comprises directional thermal properties including at least one axial directional thermal property and at least one radial directional thermal property. The at least one axial directional thermal property may comprise one or more of: axial thermal diffusivity, axial thermal conductivity, and axial thermal effusivity, and the at least one radial directional thermal property may comprise one or more of: radial thermal diffusivity, radial thermal conductivity, and radial thermal effusivity.

Different procedures could be used to determine the initial guess of the thermal transport property. As one example, determining the initial guess of a thermal diffusivity of the sample material may be performed by modeling a plurality of modeled temperatures using a temperature equation that is a function of thermal diffusivity and time (described in more detail below) over a range of thermal diffusivities (e.g. calculating modeled temperatures for a subset of measured times {t} for a range of thermal diffusivities, such as $\kappa \in \{1.1^n * 1e^{-7} | n \in \mathbb{N} < 75\}$) and comparing the plurality of modeled temperatures to the measured temperature data. As described in more detail below, the modeled temperatures can be unscaled modeled temperatures or scaled modeled temperatures. The initial guess of the thermal diffusivity may be selected as the thermal diffusivity, κ, that produces modeled temperatures with the best R-squared value to the measured temperature data. However, as noted above the guess procedure may be varied and alternative methods of determining an initial guess of the thermal diffusivities may be used.

Figure 4:
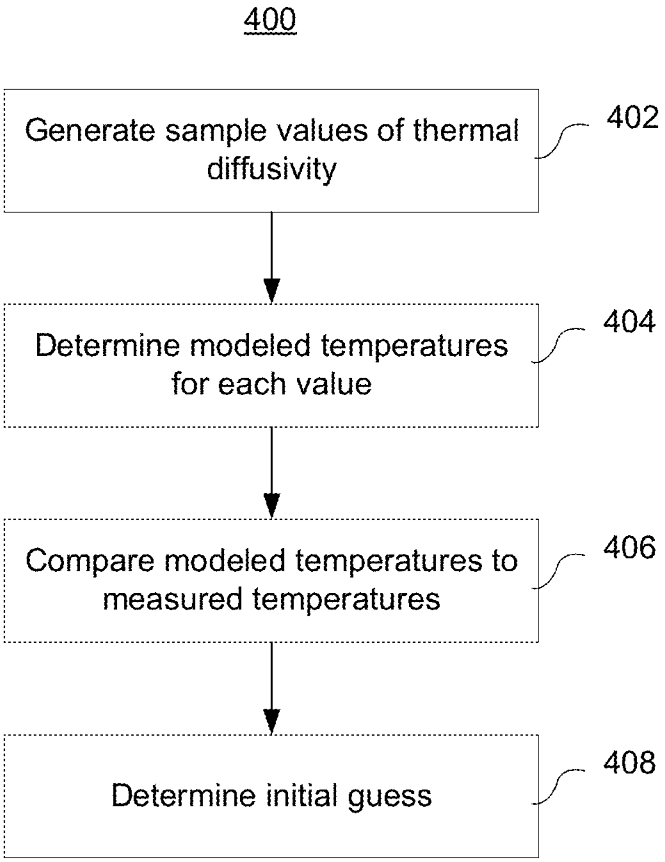
FIG. 4 shows an example of a method of determining an initial guess of thermal diffusivity of the sample material.

FIG. 4 shows an example of a method of determining an initial guess of thermal diffusivity of the sample material. As noted above, different methods could be used for determining an initial guess of the thermal diffusivity, and therefore the method 400 is non-limiting.

In the method 400, a series of values of diffusivities are generated (402). For example, a set of diffusivities covering a predefined range of diffusivities that may be expected from solids, e.g. $\{\kappa \in \{1.1^n + 1e^{-7}\ m^2/s | n \in \mathbb{N} < 75\}$, in a predetermined amount of increments, e.g. 75 exponentially distributed increments, are generated. The time offset is initially selected to be 0. It should be noted that in cases where the sample may be anisotropic, the directional diffusivities $\{\kappa_r, \kappa_z\}$ are considered instead. The range of the diffusivities values may then be, as an example, $\{\kappa_r, \kappa_z\} \in \{1.15^n * 1e^{-7} | n \in \mathbb{N} < 50\} \times \{1.15^m * 1e^{-7} | m \in \mathbb{N} < 50\}$, where the predefined range is instead 50 exponentially distributed increments that covers the same range of diffusivities but is more sparsely distributed, as an example.

Unscaled modeled temperatures are calculated using a temperature equation (described below) for each value of thermal diffusivity (404). The unscaled modeled temperatures may be calculated for a restricted set of time points.

The unscaled modeled temperatures are compared to the measured temperature data (406), for each value of thermal diffusivity. For example, a linear fit may be applied using the measured temperature data from the measurement data as x-values and the unscaled modeled temperatures as y-values. A linear fit removes the dependence on conductivity and accounts for any temperature offset. By using the linear fit, it is possible to determine the coefficient of determination (R-squared value) for each iteration (every diffusivity value), which represents how good the modeled temperatures match the measured temperature data. From the linear fit, a scaling factor can be estimated (described below) and applied to the unscaled modeled temperatures to determine scaled modeled temperatures, and these scaled modeled temperatures can also or instead be compared to the measured temperature data instead of the unscaled modeled temperatures.

Based on the comparison of modeled temperatures to measured temperatures for each value of thermal diffusivity, an initial guess of the thermal diffusivity for use in non-linear fitting is determined (408). In particular, after modeling temperatures for the different values of thermal diffusivities, the initial guess for the thermal diffusivity may be selected as the value K that resulted in the highest coefficient of determination (i.e. that provided modeled temperatures having a best linear fit to the measured temperature data).

Referring back to the method 300 of FIG. 3, a non-linear fitting technique is applied (306) to determine a modeled thermal property of the sample material using the initial guess of the thermal transport property and a temperature equation that is a function of the thermal transport property, time, and the power supplied to the transient plane source sensor. Different temperature equations may be selected according to the testing configuration. Non-linear fitting techniques work by iteratively changing fitting parameters in a calculation until the calculated results match a desired value. The non-linear fitting technique for determining the modeled thermal property of the sample material uses the thermal transport properties of the sample material as fit parameters to determine the modeled thermal property of the sample material.

In one of many possible forms, the temperature equation can be written out as $$\frac{\text{Scaling}}{\rho C_p} \int_0^t g\left(\frac{\kappa x}{a^2}, \frac{\kappa x}{h^2}\right) dx,$$

where scaling is a factor that includes power per area amongst other terms, $\rho C_p$ is the volumetric heat capacity, κ is diffusivity, a is radius of the sensor, h is a height of the sample, and t represents an individual time from the time inputs, this integral must be repeated for all times that are being used in the non-linear fit. The function "g" with two inputs specific to the slab setup and can be further divided into $$h_1\left(\frac{\kappa x}{a^2}\right) h_2\left(\frac{\kappa x}{h^2}\right)$$

where $h_1$ and $h_2$ are relatively simple expressions.

The conversion of the function described above to account for anisotropy is accomplished by changing the inputs for $h_1$ and $h_2$ to $$\frac{\kappa_r x}{a^2}$$

and $$\frac{\kappa_z x}{a^2},$$

respectively, where $\kappa_r$ and $\kappa_z$ are radial and axial diffusivities, respectively. The volumetric heat capacity is independent of directional properties, and so is not affected by the introduction of anisotropy.

In one example, the temperature equation used in the non-linear fitting technique (and the initial guess procedure in the example described above) for a small and/or conductive sample material where heat hits both the axial and radial boundaries of the sample material during the measurement period may be a scaled temperature equation including axial and radial thermal diffusivities that takes the form of the following Equation (1):

$$V_{ave}(t, \rho C_p, \kappa_z, \kappa_r, a, b, h, P) := \tag{1}$$

$$V_{ave}(t, \rho C_p, \kappa_z, \kappa_r) = \frac{P}{\pi a^2 \rho C_p h}\left[\frac{a^2}{2b^2}\left\{t + 2\sum_{n=1}^{\infty}\frac{1-e^{-t\frac{\kappa_z n^2\pi^2}{h^2}}}{\left(\frac{\kappa_z n^2\pi^2}{h^2}\right)}\right\} + 2\sum_{m=1}^{\infty}\frac{J_1^2\left(\frac{a j_{1m}}{b}\right)}{j_{1m}^2 J_0^2(j_{1m})}\left\{\frac{1-e^{-t\frac{\kappa_r j_{1m}^2}{b^2}}}{\left(\frac{\kappa_r j_{1m}^2}{b^2}\right)} + 2\sum_{n=1}^{\infty}\frac{1-e^{-t\left(\frac{\kappa_z n^2\pi^2}{h^2}+\frac{\kappa_r j_{1m}^2}{b^2}\right)}}{\left(\frac{\kappa_z n^2\pi^2}{h^2}+\frac{\kappa_r j_{1m}^2}{b^2}\right)}\right\}\right]$$

or an unscaled temperature equation (i.e. omitting volumetric heat capacity) that takes the form of the following Equation (2):

$$V_{ave,mod}(t, \kappa_z, \kappa_r) = \frac{P}{\pi a^2 h}\left[\frac{a^2}{2b^2}\left\{t + 2\sum_{n=1}^{\infty}\frac{1-e^{-t\frac{\kappa_z n^2\pi^2}{h^2}}}{\left(\frac{\kappa_z n^2\pi^2}{h^2}\right)}\right\} + 2\sum_{m=1}^{\infty}\frac{J_1^2\left(\frac{a j_{1m}}{b}\right)}{j_{1m}^2 J_0^2(j_{1m})}\left\{\frac{1-e^{-t\frac{\kappa_r j_{1m}^2}{b^2}}}{\left(\frac{\kappa_r j_{1m}^2}{b^2}\right)} + 2\sum_{n=1}^{\infty}\frac{1-e^{-t\left(\frac{\kappa_z n^2\pi^2}{h^2}+\frac{\kappa_r j_{1m}^2}{b^2}\right)}}{\left(\frac{\kappa_z n^2\pi^2}{h^2}+\frac{\kappa_r j_{1m}^2}{b^2}\right)}\right\}\right] \tag{2}$$

where P is power, a is radius of the sensor, h is a height of the sample material, $\kappa_r$ is radial thermal diffusivity, $\kappa_z$ is axial thermal diffusivity, and $J_0$ and $J_1$ are modified Bessel functions. It will be appreciated that mathematical equivalents of Equations (1) and (2) are also possible. Further, where the sample material is an isotropic slab, Equations (1) and (2) may be modified by setting $\kappa_r=\kappa_z$. It will also be appreciated that Equations (1) and (2) can be rewritten to replace the axial and radial thermal diffusivities with axial and radial thermal conductivities, or other thermal transport properties. For example, a relationship between volumetric heat capacity, $\rho C_p$, and directional properties of thermal diffusivities $\kappa_r$, $\kappa_z$ and thermal conductivities $\lambda_r$, $\lambda_z$ is shown in the following Equation (3).

$$\rho C_p = \frac{\lambda_r}{\kappa_r} = \frac{\lambda_z}{\kappa_z} \tag{3}$$

The Equation (2) may be considered an unscaled temperature equation because it is independent of the volumetric heat capacity of the sample and the units of Equation (2) are not units of temperature. To determine a scaled temperature from the unscaled temperature, the unscaled temperature is multiplied by the inverse of the volumetric heat capacity, as seen in Equation (1). As described in more detail herein, the unscaled temperature may be linearized to determine the scaled temperatures without using volumetric heat capacity as an input. For example, let V be an unscaled modeled temperature and T is a measured temperature. The linearization procedure is conducted with the aim of calculating a scaled modeled temperature, V'. By using the best fit parameters of a linear fit from V to T (more details below), it is possible to determine slope A and intercept B. The values of A and B can then be used to form the scaled temperature equation, i.e. V'=AV+B, or $V'_{ave,mod}(t, \kappa_z, \kappa_r, \{T\}) = AV_{ave,mod}(t, \kappa_z, \kappa_r)+B$. In this procedure, the values of A and B are selected to minimize $(V_{ave,mod}(t, \kappa_z, \kappa_r)-T)^2/(T-\text{mean}(T))^2$. It should also be noted that for isotropic samples, the relationship can be simplified to $V'_{ave,mod}(t, \kappa, \{T\}) = V'_{ave,mod}(t, \kappa_z, \kappa_r, \{T\})$.

For a cylindrical slab where heat hits the radial boundary but not the axial boundary of the slabs during the measurement, the slab can be treated as an infinitely tall cylinder and the scaled temperature equation is given by Equation (4):

$$v_{cyl} = \frac{2bP}{\pi a^2 \lambda_b}\left[\frac{a^2}{2b^2 b}\sqrt{\frac{\kappa_r t}{\pi}} + \sum_{m=1}^{\infty}\frac{\mathcal{J}_1^2\left(\frac{a}{b}j_{1,m}\right)}{j_{1,m}^3\mathcal{J}_0^2(j_{1,m})}\operatorname{erf}\left(\frac{j_{1,m}}{b}\sqrt{\kappa_r t}\right)\right] \tag{4}$$

Note in Equation (4) that $\lambda_b$ is a bulk conductivity used instead of $\rho C_p$. It should also be noted that $$\lambda_b = \sqrt{\lambda_r \lambda_z},$$

for an isotropic sample $\lambda_r=\lambda_z=\lambda_b$.

Equations (1) and (2) may also be written as the inverse Laplace transform of an infinite sum. In Laplace space, extensions for some different cases are simple to introduce. Equation (1) written in Laplace space, with Laplace parameter s replacing time t, is given by Equation (5):

$$\bar{V}_{ave}(s, \rho C_p, \kappa_z, \kappa_r, a, b, h, P) := \tag{5}$$

$$\bar{V}_{ave}(s, \rho C_p, \kappa_z, \kappa_r) = \frac{2P}{\pi a^2 s \rho C_p \kappa_z}\left[\frac{a^2\coth\left(h\sqrt{\frac{s}{\kappa_z}}\right)}{4b^2\sqrt{\frac{s}{\kappa_z}}} + \right.$$

-continued $$\sum_{m=1}^{\infty}\frac{J_1^2\left(\frac{aj_{1,m}}{b}\right)}{j_{1,m}^2J_0^2(j_{1,m})}\frac{\coth\left(h\sqrt{\frac{s}{\kappa_z}+\frac{\kappa_r j_{1,m}^2}{\kappa_z b^2}}\right)}{\sqrt{\frac{s}{\kappa_z}+\frac{\kappa_r j_{1,m}^2}{\kappa_z b^2}}}\Bigg]$$

The case where a thermally infinite cylinder of known thermal properties (bulk conductivity $\lambda_i$ and radial diffusivity $\kappa_i$, where i is used to denote these properties as this will be used to account for insulation) and of the same radius as the sample cylinders is included on each side of the system (i.e. wherein the sensor is in contact with and placed in between two slabs, and each slab is in contact with insulation at an opposing surface) can be treated with the following Equation (6):

$$\bar{V}_{ave}(s,\rho C_p,\kappa_z,\kappa_r,a,b,h,P,\kappa_i,\lambda_i) := \bar{V}_{ave}(s,\rho C_p,\kappa_z,\kappa_r) = \tag{6}$$

$$\frac{2P}{\pi a^2 s\rho C_p\kappa_z}\left[\frac{a^2}{4b^2\sqrt{\frac{s}{\kappa_z}}}\left(\left\{\coth\left(h\sqrt{\frac{s}{\kappa_z}}\right)+\frac{\rho C_p\kappa_z\sqrt{\frac{s}{\kappa_z}}}{\lambda_i\sqrt{\frac{s}{\kappa_i}}}\right\}^{-1}+\right.\right.$$

$$\left.\left\{\frac{1}{\coth\left(h\sqrt{\frac{s}{\kappa_z}}\right)}+\frac{\lambda_i\sqrt{\frac{s}{\kappa_i}}}{\rho C_p\kappa_z\sqrt{\frac{s}{\kappa_z}}}\right\}^{-1}\right)+$$

$$\sum_{m=1}^{\infty}\frac{J_1^2\left(\frac{aj_{1,m}}{b}\right)}{j_{1,m}^2J_0^2(j_{1,m})}\frac{1}{\sqrt{\frac{s}{\kappa_z}+\frac{\kappa_r j_{1,m}^2}{\kappa_z b^2}}}\left(\left\{\coth\left(h\sqrt{\frac{s}{\kappa_z}+\frac{\kappa_r}{\kappa_z}\frac{j_{1,m}^2}{b^2}}\right)+\right.\right.$$

$$\left.\frac{\rho C_p\kappa_z\sqrt{\frac{s}{\kappa_z}+\frac{\kappa_r j_{1,m}^2}{\kappa_z b^2}}}{\lambda_i\sqrt{\frac{s}{\kappa_i}+\frac{j_{1,m}^2}{b^2}}}\right\}^{-1}+$$

$$\left.\left.\left\{\frac{1}{\coth\left(h\sqrt{\frac{s}{\kappa_z}+\frac{\kappa_r j_{1,m}^2}{\kappa_z b^2}}\right)}+\frac{\lambda_i\sqrt{\frac{s}{\kappa_i}+\frac{j_{1,m}^2}{b^2}}}{\rho C_p\kappa_z\sqrt{\frac{s}{\kappa_z}+\frac{\kappa_r j_{1,m}^2}{\kappa_z b^2}}}\right\}^{-1}\right)\right]$$

The case where one of the cylinder samples is replaced by an insulating cylinder of the same radius, thermally infinite height and known thermal properties $\{\kappa_i, \lambda_i\}$ (i.e. wherein one surface of the sensor is in contact with insulation) can be treated with the following Equation (7):

$$\bar{V}_{ave}(s,\rho C_p,\kappa_z,\kappa_r,a,b,h,P,\kappa_i,\lambda_i) := \tag{7}$$

$$\bar{V}_{ave}(s,\rho C_p,\kappa_z,\kappa_r) = \frac{4P}{\pi a^2 s}\left[\frac{a^2}{4b^2}\left\{\frac{\rho C_p\kappa_z\sqrt{\frac{s}{\kappa_z}}}{\coth\left(h\sqrt{\frac{s}{\kappa_z}}\right)}+\lambda_i\sqrt{\frac{s}{\kappa_i}}\right\}^{-1}+\right.$$

-continued $$\left.\sum_{m=1}^{\infty}\frac{J_1^2\left(\frac{aj_{1,m}}{b}\right)}{j_{1,m}^2J_0^2(j_{1,m})}\left\{\frac{\rho C_p\kappa_z\sqrt{\frac{s}{\kappa_z}+\frac{\kappa_r j_{1,m}^2}{\kappa_z b^2}}}{\coth\left(h\sqrt{\frac{s}{\kappa_z}+\frac{\kappa_r j_{1,m}^2}{\kappa_z b^2}}\right)}+\lambda_i\sqrt{\frac{s}{\kappa_i}+\frac{j_{1,m}^2}{b^2}}\right\}^{-1}\right]$$

The case where one of the cylinder samples is replaced by an insulating cylinder of the same radius, thermally infinite height and known thermal properties $\{\kappa_i, \lambda_i\}$ and the remaining sample is placed in contact with another thermal infinite cylinder of the same radius and known properties $\{\kappa_i, \lambda_i\}$, effectively combining the two previous extensions (i.e. the sensor is in contact with one slab of sample material and is in contact with insulation at an opposing surface of the sensor, and wherein the sample material is further in contact with insulation at a surface opposite that in contact with the sensor), can be treated with the following Equation (8):

$$\bar{V}_{ave}(s,\rho C_p,\kappa_z,\kappa_r,a,b,h,P,\kappa_i,\lambda_i) := \bar{V}_{ave}(s,\rho C_p,\kappa_z,\kappa_r) = \tag{8}$$

$$\frac{4P}{\pi a^2 s}\left[\frac{a^2}{4b^2}\left\{\rho C_p\kappa_z\sqrt{\frac{s}{\kappa_z}}\left\{\coth\left(h\sqrt{\frac{s}{\kappa_z}}\right)+\frac{\rho C_p\kappa_z\sqrt{\frac{s}{\kappa_z}}}{\lambda_i\sqrt{\frac{s}{\kappa_i}}}\right\}^{-1}+\right.\right.$$

$$\left.\rho C_p\kappa_z\sqrt{\frac{s}{\kappa_z}}\left\{\frac{1}{\coth\left(h\sqrt{\frac{s}{\kappa_z}}\right)}+\frac{\lambda_i\sqrt{\frac{s}{\kappa_i}}}{\rho C_p\kappa_z\sqrt{\frac{s}{\kappa_z}}}\right\}^{-1}+\lambda_i\sqrt{\frac{s}{\kappa_i}}\right\}^{-1}+$$

$$\sum_{m=1}^{\infty}\frac{J_1^2\left(\frac{aj_{1,m}}{b}\right)}{j_{1,m}^2J_0^2(j_{1,m})}\left\{\rho C_p\kappa_z\sqrt{\frac{s}{\kappa_z}+\frac{\kappa_r}{\kappa_z}\frac{j_{1,m}^2}{b^2}}\left\{\coth\left(h\sqrt{\frac{s}{\kappa_z}+\frac{\kappa_r}{\kappa_z}\frac{j_{1,m}^2}{b^2}}\right)+\right.\right.$$

$$\left.\frac{\rho C_p\kappa_z\sqrt{\frac{s}{\kappa_z}+\frac{\kappa_r j_{1,m}^2}{\kappa_z b^2}}}{\lambda_i\sqrt{\frac{s}{\kappa_i}+\frac{j_{1,m}^2}{b^2}}}\right\}^{-1}+$$

$$\rho C_p\kappa_z\sqrt{\frac{s}{\kappa_z}+\frac{\kappa_r}{\kappa_z}\frac{j_{1,m}^2}{b^2}}\left\{\frac{1}{\coth\left(h\sqrt{\frac{s}{\kappa_z}+\frac{\kappa_r j_{1,m}^2}{\kappa_z b^2}}\right)}+\right.$$

$$\left.\left.\left.\frac{\lambda_i\frac{s}{\kappa_i}+\frac{j_{1,m}^2}{b^2}}{\rho C_p\kappa_z\sqrt{\frac{s}{\kappa_z}+\frac{\kappa_r j_{1,m}^2}{\kappa_z b^2}}}\right\}^{-1}+\lambda_i\sqrt{\frac{s}{\kappa_i}+\frac{j_{1,m}^2}{b^2}}\right\}^{-1}\right]$$

It will be appreciated that the non-linear fitting technique may be applied using either an unscaled temperature equation (as a function of thermal transport property) or the scaled temperature equation (where the volumetric heat capacity or bulk conductivity is also introduced as a fitting parameter). Other fitting parameters, such as a temperature offset (caused by the sensor interface) and/or a time offset (e.g. caused by sensor effects) could be considered. For each fitting parameter, an initial guess of the fitting parameter is passed to the non-linear fitting. As described above, the means of determining the initial guess may vary. An initial guess of volumetric heat capacity and/or temperature offset may be obtained from the slope of the best linear fit described with reference to the method 400. Otherwise, an initial guess of the volumetric heat capacity and/or temperature offset could be a generic value. An initial guess of the time offset could simply be a best guess of the operator of the measurement system 110, and may for example be set to zero seconds.

Accordingly, the non-linear fitting may be performed using just the thermal transport property as fit parameters, or a combination of fitting parameters including one or more thermal transport properties, possibly in combination with one or more of volumetric heat capacity, temperature offset, and time offset. However, it will also be appreciated that as the number of fit parameters increase, the computation time of the non-linear fitting increases, and therefore in certain situations it may be advantageous to determined thermal properties of the sample material using a smaller number of fitting parameters.

Figure 5:
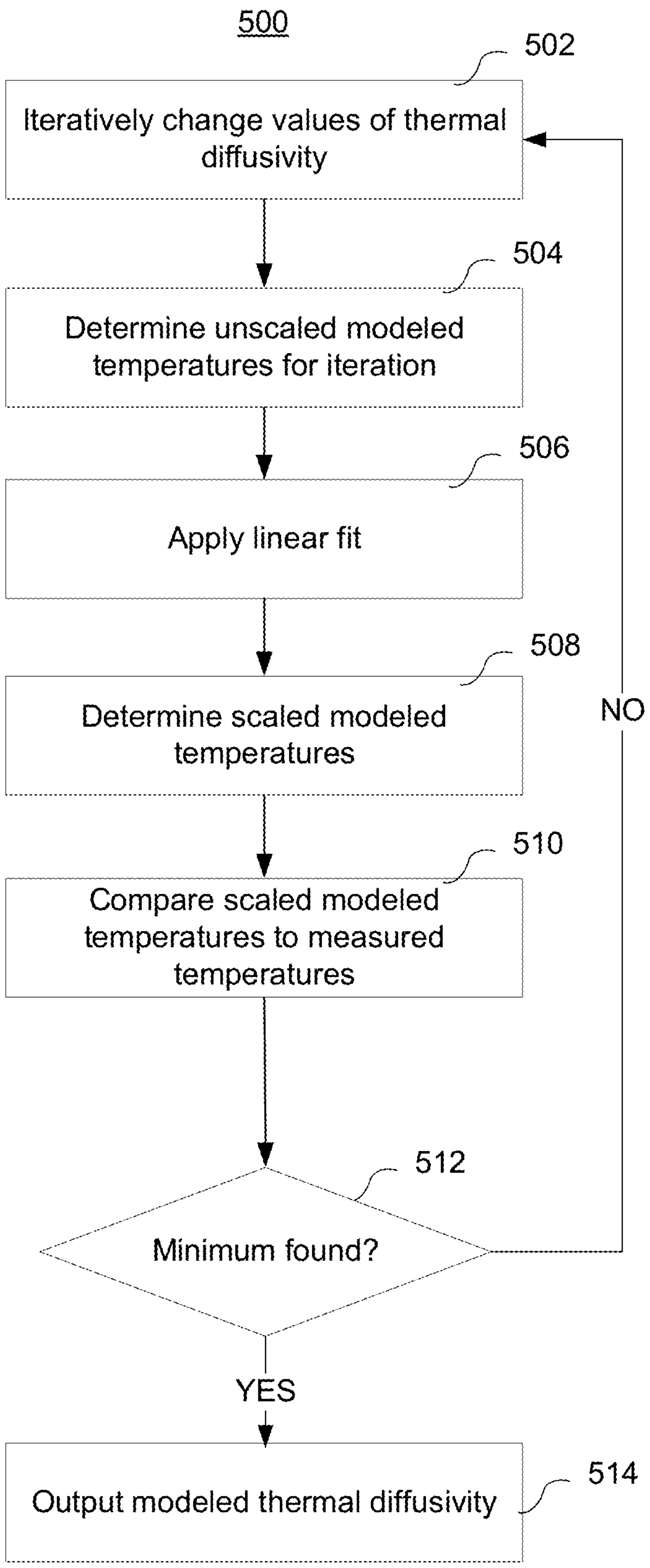
FIG. 5 shows an example of a method of applying a non-linear fitting technique to determine a modeled thermal diffusivity of the sample material.

FIG. 5 shows an example of a method of applying a non-linear fitting technique to determine a modeled thermal diffusivity of the sample material, where the volumetric heat capacity, temperature offset, and time offset are not used as a fitting parameter. In one example, a Levenberg-Marquardt fitting algorithm may be used where the fit properties are $\{\kappa\}$ (isotropic case) or $\{\kappa_r, \kappa_z\}$ (anisotropic case). However, it will also be appreciated that other non-linear fitting algorithms and techniques can be used.

The method 500 comprises iteratively changing values of thermal diffusivity (or axial and radial thermal diffusivities) (502), starting with the initial guess of the thermal diffusivity. The manner in which the values of thermal diffusivities are iteratively changed can vary depending on the non-linear fitting technique.

At each iteration, unscaled modeled temperatures are determined as a function of time for a current iteration (504). That is, values of $\{\kappa_r, \kappa_z\}$ for the iteration are inserted into equation (2) over a set of times to determine $V'(t-t_o, \kappa, \{T_{fit}\})$. It should be noted that $\{T_{fit}\}$ represents the set of measured temperatures that the fitting process corresponds to.

A linear fit is applied (506) to the unscaled modeled temperatures and the measured temperature data to find the slope and intercept. For example, a linear fit may be applied using the measured temperature data from the measurement data as x-values and the unscaled modeled temperatures as y-values. In this case, for Equation (2), the slope of the linear fit is the inverse of volumetric heat capacity, and the intercept represents a temperature offset due to sensor contact. For a cylindrical slab with thickness much greater than a sensor radius such that the measurement data does not include a temperature response in the axial boundary, the inverse of the slope obtained from a linear fit of unscaled modeled temperatures is $\lambda_b$ instead of $\rho C_p$. It should also be noted that $$\lambda_b = \sqrt{\lambda_r \lambda_z},$$

and for an isotropic sample $\lambda_r=\lambda_z=\lambda_b$. For the case of infinitely tall cylinders, the thermal properties will only depend on on $\lambda_b$ and $\kappa_r$. Using a linear fit in this manner to determine the volumetric/bulk heat capacity and temperature offset removes dependence on these parameters as fit parameters, which would greatly increase computation time.

Scaled modeled temperatures are calculated (508) as the product of slope and unscaled modeled temperatures plus the intercept.

The scaled modeled temperatures for a current iteration are compared to the measured temperature data (510). A determination is made as to whether a minimum difference between the scaled modeled temperatures and the measured temperature data has been found (512). If the minimum has not been found (NO at 512), the method 500 returns to 502 and iteratively changes values of thermal diffusivity. If the minimum has been found (YES at 512), the modeled thermal diffusivity of the sample material are output (514) as the thermal diffusivity for the iteration producing the minimum.

Referring back to FIG. 3, a thermal property of the sample is determined (308). In this case, the modeled thermal transport properties (i.e. diffusivities, conductivities, and/or effusivities) are determined as outputs from the non-linear fitting. Note that for an isotropic case, the thermal transport properties are equal in the axial and radial directions, while in an anisotropic case the thermal transport properties are directional.

One or more other thermal properties of the sample may be determined. For example, the method may further comprise determining a volumetric heat capacity of the sample material, if the volumetric heat capacity was not already a fit parameter. For example, the best fit volumetric heat capacity is the inverse of the slope of the linear fit determined at 506 for the iteration providing the minimum. The method may further comprise determining thermal conductivities of the sample material from the volumetric heat capacity and the thermal diffusivities using Equation (3).

The non-linear fitting technique may be applied to a time window that is a subset of the measurement period. For example, a fitting window $\{t_i, t_f\}$ may be selected where $t_i$ and $t_f$ represent the start and end of the window and encompasses the set of time data between $t_i$ and $t_f$ and their corresponding temperatures. The data from this fitting window may used for the fitting algorithm and in some embodiments may for example be from 0.15 s until the end of the measurement period. The method may further comprise calculating modeled temperatures outside the time window using the modeled thermal property to show that the anisotropic effects are clear.

As outlined previously, it is possible to include volumetric heat capacity and temperature offset as parameters in the linear and non-linear fitting. In this case, during the non-linear fitting, the inverse of the slope for the best guess diffusivity may be used as an initial guess volumetric heat capacity and the offset associated with the same diffusivity may be used as the temperature offset initial guess. These four values are now used as fit parameters for the non-linear fitting where $f(t_o, \rho C_p, \kappa, T_o)$ is instead $V_{ave}(t-t_o, \rho C_p, \kappa)+T_o$ and no linearization is ever performed during the nonlinear fitting or in acquiring the final values. The best fitting properties as determined by the non-linear fitting algorithm are then the measured properties and offsets. It will also be appreciated that volumetric heat capacity and temperature offset can also be included as fit parameters for cases where the samples may be anisotropic in a process that combines the two embodiments discussed above.

Figure 7A:
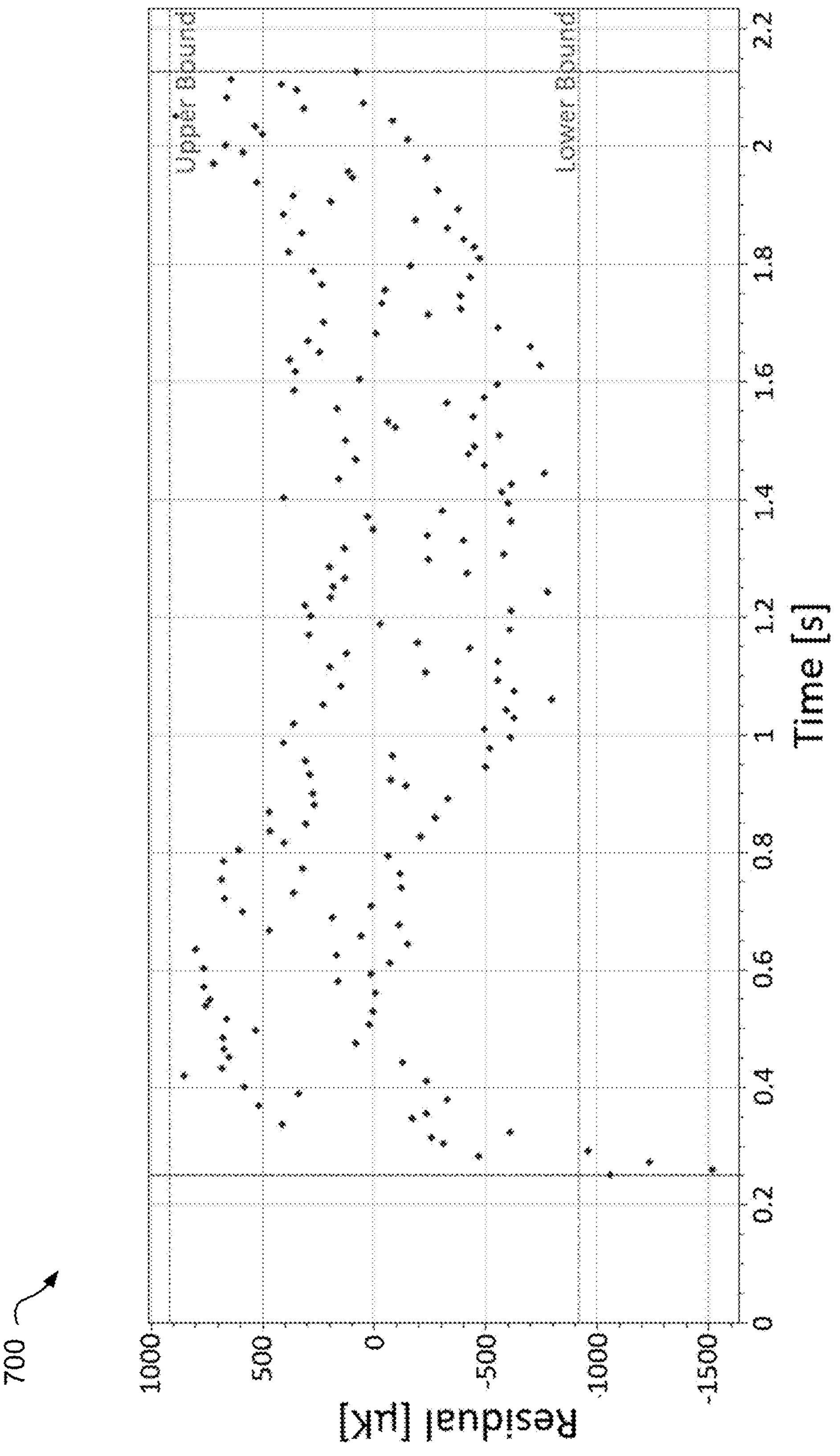
FIGS. 7A to 7C show graphs comparing the calculation technique of the present disclosure to existing techniques.
Figure 7B:
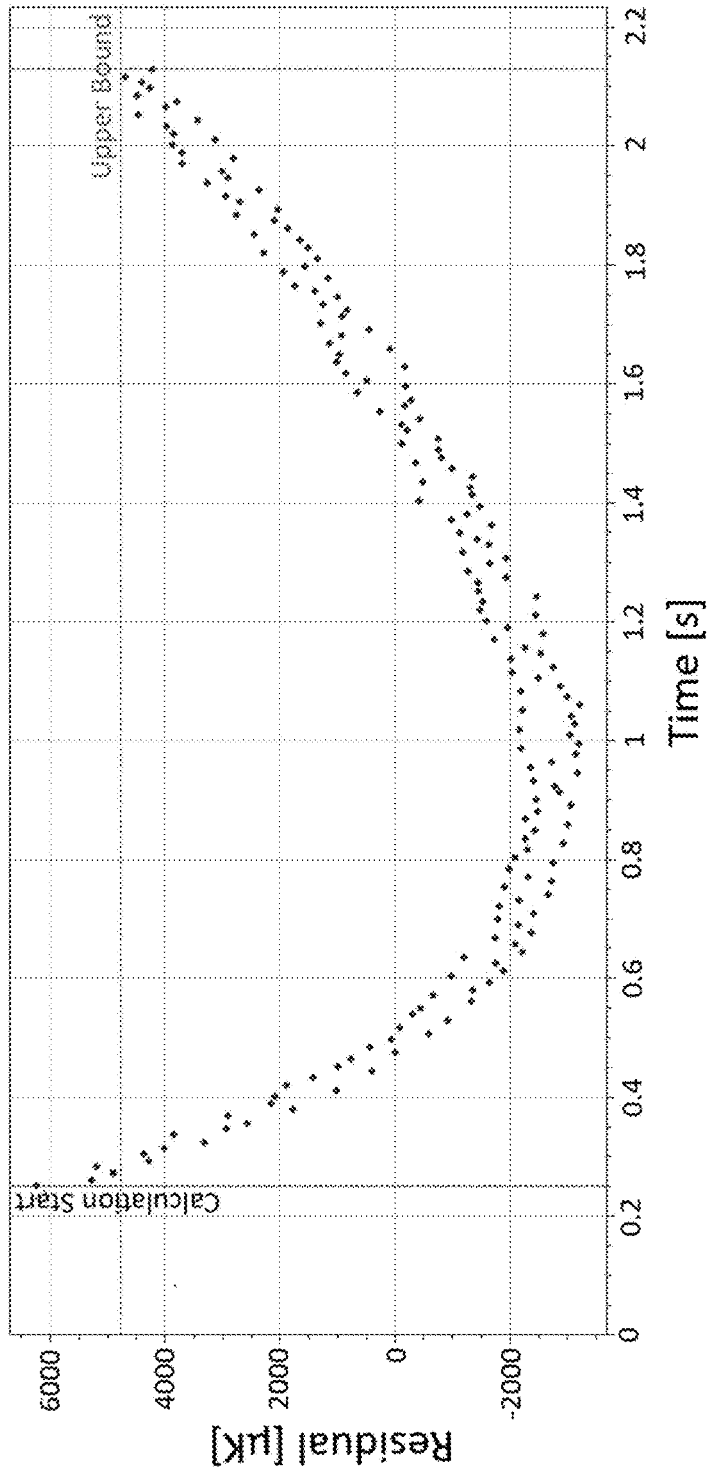
Figure 7C:
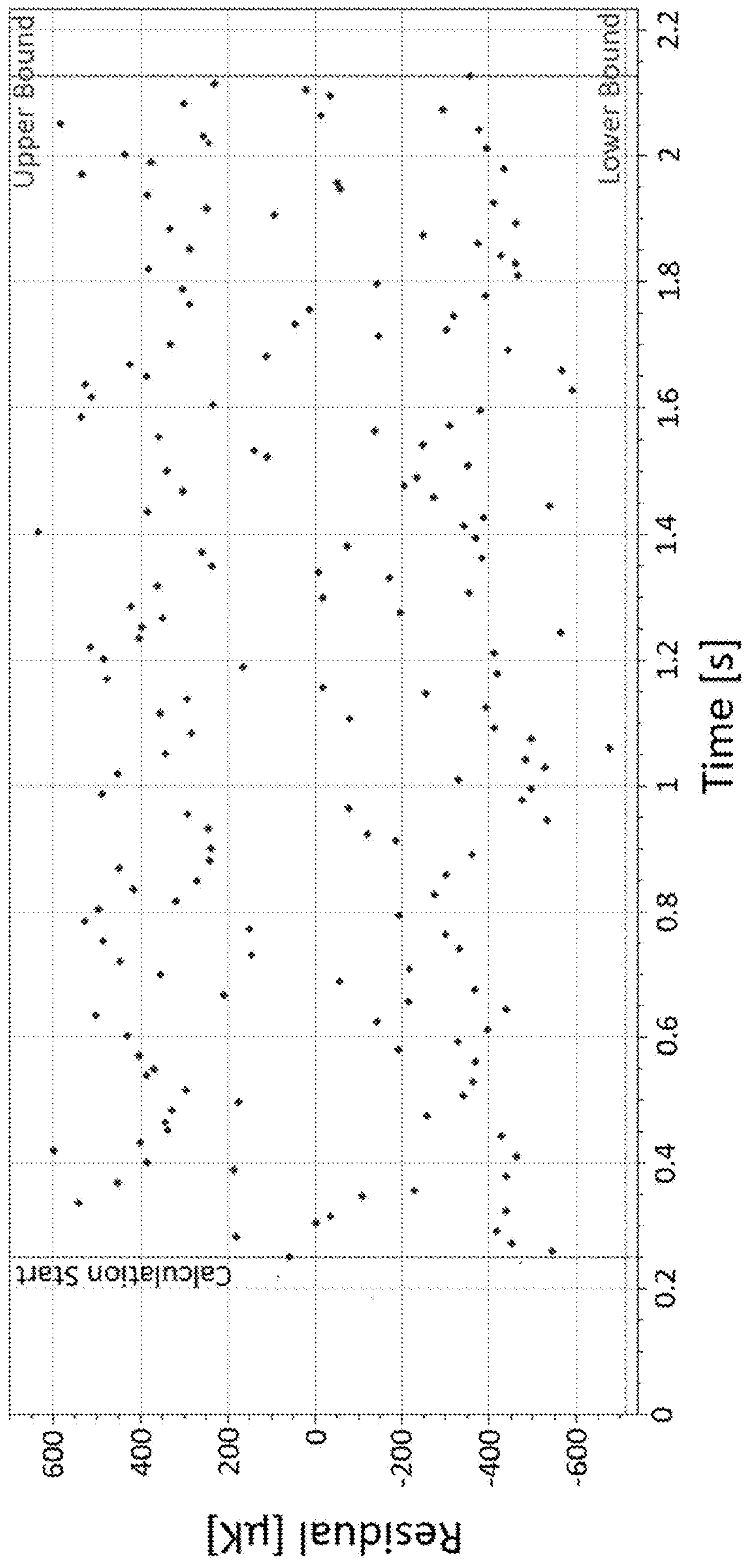

FIGS. 7A to 7C show graphs comparing the calculation technique of the present disclosure to existing techniques. The three graphs are derived from the same experiment with measurement data over 2 seconds on cylinders of copper that were 25.5 mm in height and 31.5 mm in diameter. The calculations were performed for a 3D Disk Source method over a time window from 0.25 to 2 seconds.

The graph 700 shown in FIG. 7A shows residuals calculated using a bulk disk fit method over a range from 0.25 to 2 seconds. The residuals are reasonable but the calculated thermal property values are poor, as shown in Table 1 below.

TABLE 1

| Fit Results | | Quality Indicators | | Bulk Results | |
|---|---|---|---|---|---|
| Time Offset (s) | 0.1 | Temperature Rise (K) | 0.04483 | Thermal Conductivity (W/m · K) | 62.07 |
| Temp. Offset (K) | 0.7696 | Total to Characteristic Time (TCT) | 0.005141 | Thermal Diffusivity ($mm^2/s$) | 0.0991 |
| Evaluations | 145 | Probing Depth (mm) | 0.9182 | Thermal Effusivity ($W\sqrt{s}/(m^3K)$) | 197200 |
| | | RMS Residual (μk) | 459.2 | Volumetric Specific Heat ($MJ/(m^3K)$) | 626.6 |

The graph 710 shown in FIG. 7B shows residuals calculated using a bulk disk fit method over a range of 0.25 to 2 seconds, using a fixed volumetric heat capacity of $3.4*10^6$ $J/m^3K$. Using a fixed volumetric heat capacity is one existing technique that a user may attempt to provide better results from the bulk disk fit method. The output of the bulk disk fit method with fixed volumetric heat capacity gives poor residuals but better values, as shown in Table 2, although the values are still not good. One may also attempt to perform this calculation of fixed volumetric heat capacity using a smaller window, e.g. 0.15 to 0.5 seconds, however even so the repeatability and accuracy of the results are poor.

TABLE 2

| Fit Results | | Quality Indicators | | Bulk Results | |
|---|---|---|---|---|---|
| Time Offset (s) | 0 | Temperature Rise (K) | 0.04483 | Thermal Conductivity (W/m · K) | 235.6 |
| Temp. Offset (K) | 0.6778 | Total to Characteristic Time (TCT) | 3.596 | Thermal Diffusivity ($mm^2/s$) | 69.28 |
| Evaluations | 179 | Probing Depth (mm) | 24.28 | Thermal Effusivity ($W\sqrt{s}/(m^3K)$) | 28300 |
| | | RMS Residual (μk) | 2386 | Volumetric Specific Heat ($MJ/(m^3K)$) | 3.4 |

The graph 750 shown in FIG. 7C shows residuals calculated using the calculation method in accordance with the present disclosure over the same window. Both the residuals and the results (shown in Table 3) are very good.

TABLE 3

| Fit Results | | Quality Indicators | | Bulk Results | |
|---|---|---|---|---|---|
| Time Offset (s) | 0.01 | Temperature Rise (K) | 0.04483 | Thermal Conductivity (W/m · K) | 357.9 |
| Temp. Offset (K) | 0.7115 | Total to Characteristic Time (TCT) | 5.6 | Thermal Diffusivity ($mm^2/s$) | 107.9 |
| Evaluations | 31 | Probing Depth (mm) | 45.46 | Thermal Effusivity ($W\sqrt{s}/(m^3K)$) | 34450 |
| | | RMS Residual (μk) | 356.6 | Volumetric Specific Heat ($MJ/(m^3K)$) | 3.317 |

It would be appreciated by one of ordinary skill in the art that the system and components shown in the figures may include components not shown in the drawings. For simplicity and clarity of the illustration, elements in the figures are not necessarily to scale, are only schematic and are non-limiting of the elements structures. It will be apparent to persons skilled in the art that a number of variations and modifications can be made without departing from the scope of the invention as described herein.

The invention claimed is:

1. A computer-implemented thermal property measurement method, comprising:

obtaining measurement data of a sample material over a measurement period using a transient plane source sensor placed in contact with at least one solid cylinder slab of the sample material, wherein the measurement data is obtained using the transient plane source sensor by supplying power from a power source that heats up the transient plane source sensor and the sample material, and recording, with the transient plane source sensor, a time-dependent temperature increase of the sample material, wherein each of the at least one solid cylinder slab of the sample material has a slab radius that is larger than a radius of the sensor and less than twice as large as the radius of the sensor, and the measurement data includes time data within the measurement period, measured temperature data of the sample material, and a power supplied to the transient plane source sensor over the measurement period, wherein the power supplied to the transient plane source sensor over the measurement period is sufficient to provide a temperature response in a radial boundary of each of the at least one solid cylinder slab; and applying a non-linear fitting technique to determine a modeled thermal property of the sample material using one or more fit parameters and a temperature equation that is a function of the thermal transport property, time, and the power supplied to the transient plane source sensor, wherein a thermal transport property of the sample material is a fit parameter in the non-linear fitting technique.

2. The method of claim 1, wherein the modeled thermal property of the sample material comprises a modeled thermal transport property determined from the non-linear fitting algorithm.

3. The method of claim 2, further comprising determining a modeled volumetric heat capacity from the modeled thermal transport property.

4. The method of claim 1, wherein the fit parameters of the non-linear fitting technique further include volumetric heat capacity, and wherein a modeled volumetric heat capacity is determined from the non-linear fitting algorithm.

5. The method of claim 1, wherein the fit parameters of the non-linear fitting technique further include a temperature offset.

6. The method of claim 1, wherein the fit parameters of the non-linear fitting technique further include a time offset.

7. The method of claim 1, wherein the sample material is anisotropic, and the thermal transport property comprises directional thermal properties including at least one axial directional thermal property and at least one radial directional thermal property.

8. The method of claim 7, wherein the at least one axial directional thermal property comprise one or more of: axial thermal diffusivity, axial thermal conductivity, and axial thermal effusivity, and wherein the at least one radial directional thermal property comprise one or more of: radial thermal diffusivity, radial thermal conductivity, and radial thermal effusivity.

9. The method of claim 1, wherein the sample material is isotropic, and the thermal transport property comprises at least one of thermal diffusivity, thermal conductivity, and thermal effusivity.

10. The method of claim 1, wherein the sensor is placed between and is in contact with two solid cylinder slabs of the sample material.

11. The method of claim 1, wherein the sensor is placed in contact with one solid cylinder slab of the sample material, and wherein an opposing surface of the sensor is in contact with insulation.

12. The method of claim 1, wherein each of the at least one solid cylinder slab of the sample material is in contact with the sensor at a first surface and is in contact with insulation at a second surface opposite the first surface, the insulation having known thermal properties, and wherein the temperature equation accounts for the insulation.

13. The method of claim 1, wherein the non-linear fitting technique is applied to a time window of the time data that is a subset of the measurement period, and the method further comprises calculating modeled temperatures outside the time window using the modeled thermal property.

14. The method of claim 1, wherein the power supplied to the transient plane source sensor over the measurement period is also sufficient to provide a temperature response in an axial boundary of each of the at least one solid cylinder slab.

15. The method of claim 1, wherein the power supplied to the transient plane source sensor over the measurement period does not provide a temperature response in an axial boundary of each of the at least one solid cylinder slab.

16. A thermal property measurement system, comprising:

a processor; and a non-transitory computer-readable memory storing computer-executable instructions which, when executed by the processor, configure the system to perform a method of:

obtaining measurement data of a sample material over a measurement period using a transient plane source sensor placed in contact with at least one solid cylinder slab of the sample material, wherein the measurement data is obtained using the transient plane source sensor by supplying power from a power source that heats up the transient plane source sensor and the sample material, and recording, with the transient plane source sensor, a time-dependent temperature increase of the sample material, wherein each of the at least one solid cylinder slab of the sample material has a slab radius that is larger than a radius of the sensor and less than twice as large as the radius of the sensor, and the measurement data includes time data within the measurement period, measured temperature data of the sample material, and a power supplied to the transient plane source sensor over the measurement period, wherein the power supplied to the transient plane source sensor over the measurement period is sufficient to provide a temperature response in a radial boundary of each of the at least one solid cylinder slab; and applying a non-linear fitting technique to determine a modeled thermal property of the sample material using one or more fit parameters and a temperature equation that is a function of the thermal transport property, time, and the power supplied to the transient plane source sensor, wherein a thermal transport property of the sample material is a fit parameter in the non-linear fitting technique.

17. The system of claim 16, wherein the computer-executable instructions, when executed by the processor, further configure the system to control the power supplied to the transient plane source sensor.

18. The system of claim 17, further comprising a power source configured to supply the power to the transient plane source sensor.

19. A non-transitory computer-readable memory storing computer-executable instructions which, when executed by a processor, configure the processor to perform a method of:

obtaining measurement data of a sample material over a measurement period using a transient plane source sensor placed in contact with at least one solid cylinder slab of the sample material, wherein the measurement data is obtained using the transient plane source sensor by supplying power from a power source that heats up the transient plane source sensor and the sample material, and recording, with the transient plane source sensor, a time-dependent temperature increase of the sample material, wherein each of the at least one solid cylinder slab of the sample material has a slab radius that is larger than a radius of the sensor and less than twice as large as the radius of the sensor, and the measurement data includes time data within the measurement period, measured temperature data of the sample material, and a power supplied to the transient plane source sensor over the measurement period, wherein the power supplied to the transient plane source sensor over the measurement period is sufficient to provide a temperature response in a radial boundary of each of the at least one solid cylinder slab; and applying a non-linear fitting technique to determine a modeled thermal property of the sample material using one or more fit parameters and a temperature equation that is a function of the thermal transport property, time, and the power supplied to the transient plane source sensor, wherein a thermal transport property of the sample material is a fit parameter in the non-linear fitting technique.

20. The method of claim 1, further comprising determining an initial guess of the of the one or more fit parameters for use in the non-linear fitting technique.

* * * * *